United States Patent [19]
Whaley

[11] Patent Number: 6,052,817
[45] Date of Patent: *Apr. 18, 2000

[54] DATA STORAGE SYSTEM INCLUDING DATA RANDOMIZER RESPONSIVE TO ADDRESS OF SELECTED DATA STORAGE LOCATION

[75] Inventor: Jeffrey L. Whaley, Boulder, Colo.

[73] Assignee: Maxtor Corporation, Longmont, Colo.

[ * ] Notice: This patent is subject to a terminal disclaimer.

[21] Appl. No.: 09/223,418

[22] Filed: Dec. 30, 1998

Related U.S. Application Data

[63] Continuation of application No. 08/732,942, Oct. 17, 1996, Pat. No. 5,889,796.

[51] Int. Cl.[7] ............................. G11C 29/00; G11B 5/09
[52] U.S. Cl. ......................... 714/769; 714/701; 360/49
[58] Field of Search ........................... 714/769, 768, 714/764, 761, 762, 701, 702; 360/48, 49, 53; 380/9, 46, 48, 50

[56] References Cited

U.S. PATENT DOCUMENTS

| | | | |
|---|---|---|---|
| 3,771,126 | 11/1973 | Apple, Jr. | 371/37.08 |
| 3,988,538 | 10/1976 | Patten | 380/50 |
| 4,064,558 | 12/1977 | Hughes et al. | 711/207 |
| 4,202,051 | 5/1980 | Davida et al. | 380/46 |
| 4,604,725 | 8/1986 | Davies et al. | 364/900 |
| 4,630,145 | 12/1986 | Thompson et al. | 360/77.08 |
| 4,639,548 | 1/1987 | Oshima et al. | 380/43 |
| 4,697,167 | 9/1987 | O'Keeffe et al. | 340/347 |
| 4,918,677 | 4/1990 | Ashinuma et al. | 369/32 |
| 4,993,029 | 2/1991 | Galbraith et al. | 371/40.14 |
| 5,163,070 | 11/1992 | Bielby et al. | 375/367 |
| 5,182,752 | 1/1993 | Deroo et al. | 371/37.7 |
| 5,220,466 | 6/1993 | Coker et al. | 360/46 |
| 5,253,131 | 10/1993 | Chevalier | 360/78.14 |
| 5,367,410 | 11/1994 | McCarthy | 360/48 |
| 5,394,405 | 2/1995 | Savir | 371/27.2 |
| 5,412,666 | 5/1995 | Squires et al. | 371/37.4 |
| 5,696,775 | 12/1997 | Nemazie et al. | 371/51.1 |
| 5,712,863 | 1/1998 | Gray | 714/806 |

*Primary Examiner*—Emmanuel L. Moise
*Attorney, Agent, or Firm*—David M. Sigmond

[57] ABSTRACT

A data storage system that is capable of performing a double check on data read from a storage media to determine whether the data is the data desired by a requesting host computer. If the data is not the desired data, the system discards the data before it reaches the host. The data storage system uses a randomizer unit having a variable initialization value. The initialization value is based upon the address of the data storage location being accessed by the host. If the initialization value used to read a piece of data is different than the value used to write the data, uncorrectable data errors result and the data is discarded.

35 Claims, 2 Drawing Sheets

DATA STORAGE SYSTEM INCLUDING DATA RANDOMIZER RESPONSIVE TO ADDRESS OF SELECTED DATA STORAGE LOCATION

CROSS-REFERENCE TO RELATED APPLICATIONS

This application is a continuation of U.S. application Ser. No. 08/732,942, filed Oct. 17, 1996 (U.S. Pat. No. 5,889, 796).

FIELD OF THE INVENTION

The present invention relates in general to digital data storage systems and, more particularly, to a method for determining whether the correct data has been read from a storage medium in a digital data storage system.

BACKGROUND OF THE INVENTION

A disk drive is a data storage device that stores digital information in concentric tracks on a storage medium, such as a magnetic or optical disk. The data is generally stored in separately addressable data sectors on the tracks of the disk that can each be individually accessed by a host computer as the disk rotates about an axis. To access a particular data sector, the host generally delivers an access request to the disk drive indicating the location of the desired data sector and whether data is to be read from or written to the desired data sector. The disk drive then moves a transducer to the position of the desired data sector and performs the requested operation.

To be able to move the transducer to the required location, a disk drive must include some means for determining the present location of the transducer. Once the present location has been determined, the disk drive can calculate how far the transducer is from the desired data sector and move the transducer accordingly. When the transducer reaches the beginning of the desired data sector, the requested data transfer can take place.

One technique for determining the present location of a transducer involves reading servo positioning information from the disk surface. For example, the disk may include a plurality of servo sectors on each track, each including an "address" that may be read by the transducer. The address may include, for example, a cylinder number identifying the track that the transducer is presently above and a sector number identifying the data sector that the transducer is about to cross over. Using the address information, a servo system determines how the transducer must be moved to access a desired data sector.

A problem with the above described method is that errors may occur while reading the servo information from the disk that result in the reading or writing of data from/to the wrong location on the disk. For example, address information from a servo sector on the disk may be incorrectly read during a seek operation so that the incorrectly read address matches the address of the desired data sector (i.e., the data sector being sought). Data will then be written to or read from an incorrect location on the disk. As data densities on disks increase, the probability of incorrectly reading address information from a disk increases as well.

Another technique for determining the present location of the transducer above the disk involves using software to estimate at least one aspect of the present location of the transducer. This technique is used, for example, in id-less disk drive systems. In an id-less drive, some or all of the address information is left out of the servo portions of the disk. For example, the disk servo sectors may include the cylinder number, but not the sector number. The sector information is determined by software in the disk drive that counts the number of data sectors that have been traversed by the transducer since a known transducer position. The count is then used to determine which data sector the transducer is presently traversing.

As is apparent, the software estimation method of determining present transducer location is also prone to error. For example, in the example above, the transducer may "miss" a data sector as the disk rotates beneath it, thereby corrupting the sector count. Also, calculational errors may occur whereby the present location of the transducer is incorrectly calculated from the various parameters being relied upon by the software. As with the previously described method, errors produced using the present method are increased as disk data densities increase.

Ideally, it is desirable that an error free method of determining the present location of the transducer be found. However, a totally error free method will probably never be discovered, especially since disk data densities are constantly increasing. A need therefore exists for a method of checking data read from the disk drive during a read operation to determine whether it is the data desired by the host. That is, the method should be capable of detecting when data is read from an incorrect location on the disk and/or when data is read from the proper location, but was incorrectly written to that location when originally stored. In addition, it would be advantageous if the method required little or no overhead on the disk surface as low overhead is always a concern in data storage systems.

SUMMARY OF THE INVENTION

The present invention relates to a data storage system that is capable of determining whether data read from a storage medium is the data that is desired by a requesting host. The system requires no additional overhead on the storage medium to perform this function. The system can detect when data is read from an incorrect storage location on the medium (i.e., a location other than the location requested by the host) and when data has been read from the correct location but was incorrectly stored at that location. The system utilizes a randomizer unit having a variable initialization value to process data before it is written onto the storage medium and after it is read from the storage medium. The variable initialization value is based upon the address of the data storage location being accessed. If data is read from the wrong physical location, the data will be scrambled and will appear to be an uncorrectable ECC error. If data is read from the correct physical location, but was previously written to the wrong physical location, the same error will occur.

In one aspect of the present invention, a method for writing data to a storage medium is provided. The method comprises the steps of: providing a storage medium having a plurality of storage locations, wherein each storage location is capable of storing at least one data segment; receiving a first data segment to be stored in a predetermined storage location of the storage medium; changing the first data segment to a different, second data segment that conforms to a predetermined code constraint regardless of the content of the first data segment, wherein the means for changing changes the first data segment based upon a variable initial value; and writing the second data segment to the predetermined data storage location of the storage medium.

The data segment may include, for example, a data block such as used in a fixed block architecture (FBA) system or any other quantum of data commonly utilized in data storage systems. The changing step may be performed, for example, by a data randomizer unit having a variable initialization value. The output of a data randomizer generally includes the same number of bits as the input. In one embodiment, the variable initialization value is based upon an address of the predetermined data storage location.

In another aspect of the present invention, a data storage system is provided. The data storage system includes: a storage medium having a plurality of storage locations, wherein each storage location is capable of storing at least one data segment; means for writing data segments to the plurality of storage locations; error detection encoding means for encoding the data segments before the data segments are written to the plurality of storage locations; means for reading a first data segment from the storage medium in response to a request from a host to read a data segment from a predetermined storage location of the storage medium; means for determining whether the first data segment is the data segment desired by the host; and means for transferring the first data segment to the host when the first data segment is determined to be the data segment desired by the host; wherein the means for determining does not require the use of any overhead on the storage medium.

In one embodiment, the means for determining includes a data randomizer having an input for a variable initial value. The means for determining may also include a means for producing the initial value based on, for example, the address of the predetermined storage location. The data randomizer can include a linear feedback shift register (LFSR). The means for transferring can include error detection decoding means for decoding the first data segment. In addition, the error detection decoding means can include error correction means for correcting up to a predetermined number of errors in the first data segment.

In another aspect of the present invention, a data storage system is also provided. The system includes: a data storage medium having a plurality of data storage locations; data transfer means for transferring a data segment between a predetermined data storage location on the data storage medium and an exterior environment in response to a request from the exterior environment; randomizer means for operating upon the data segment while the data segment is being transferred between the predetermined data storage location and the exterior environment, wherein the randomizer means is operative for changing the content of the data segment without changing the length of the data segment, the content change being dependent upon a variable initialization value received at an input of the randomizer means; and means for providing the variable initialization value to the randomizer means. The system may also include error correctional code means for encoding/decoding data being transferred between the data storage medium and an exterior environment.

In one embodiment, the means for providing determines an initialization value based on the address of the predetermined data storage location. As described above, the randomizer means may include a LFSR that is initialized with the variable initialization value when the predetermined data storage location is being accessed.

DETAILED DESCRIPTION

The present invention relates to a data storage system that is capable of checking data that is being read from a data storage medium to determine whether it is the data that is desired by a host. The host delivers a request to the data storage system for data to be read from a particular data storage location on the storage medium. The data storage system then reads data from the storage medium in response to the request. Because position errors may occur during reading and writing, the data read from the medium may not be the data that was desired by the host when the host made the request. The present invention is able to detect situations where the data read from the storage medium is not the data desired by the host. In addition, the present invention does not require the addition of any overhead to the storage medium. In this regard, the present invention is of particular value in high density data storage systems where read/write errors are more likely to occur.

Figure 1:
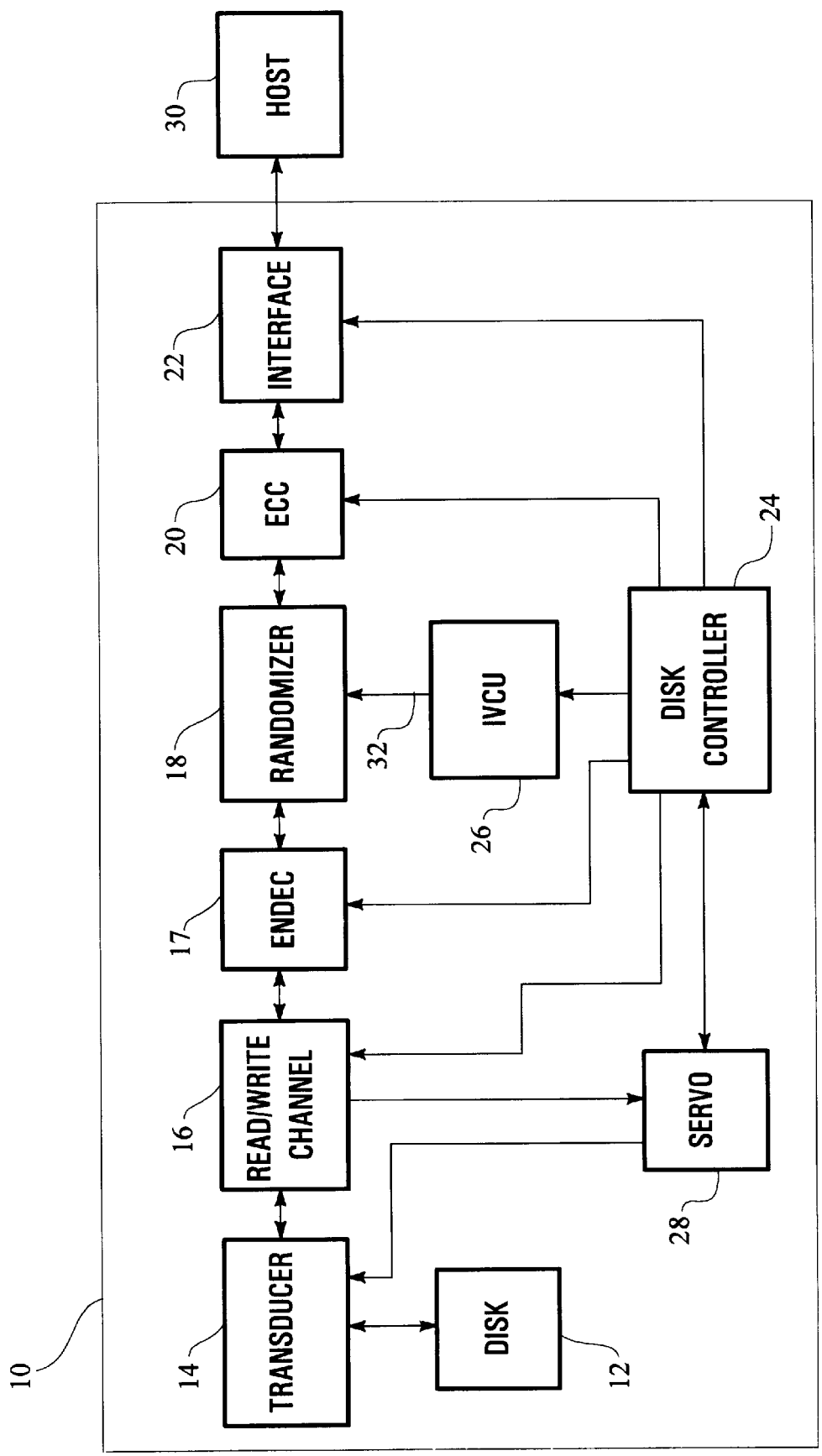
FIG. 1 is a block diagram illustrating a data storage system in accordance with one embodiment of the present invention.

FIG. 1 is a block diagram of a magnetic disk drive system 10 in accordance with one embodiment of the present invention. The system 10 includes: a disk 12, a transducer 14, a read/write channel 16, an encoder/decoder (ENDEC) unit 17, a randomizer unit 18, an error correctional code (ECC) unit 20, an interface unit 22 for interfacing with an external host 30, a disk controller 24, an initialization value determination unit (IVDU) 26, and a servo unit 28. The host 30 delivers access requests to the controller 24 via the interface 22. The controller 24 responds to each request by controlling the other elements in the system 10 to carry out the request. For example, the host 30 may request that a block of data be written to a particular track and data sector of the disk 12. The controller 24 instructs the servo unit 28 to move the transducer 14 to the proper position above the disk 12. The interface 22 receives the data block from the host 30 and transfers the data block to the ECC unit 20 under the control of the controller 24.

The ECC unit 20 processes the data block by adding redundant information to the data block so that subsequent undesired changes to the data block (i.e., data errors) can be detected and possibly corrected. The data block is then transferred to the randomizer unit 18 that processes the data block according to a variable initialization value from the IVDU 26. The IVDU 26 calculates the initialization value using storage location information from the controller 24 (e.g., the cylinder and sector information received from the host 30). The data block is then delivered to the ENDEC unit 17 where it is encoded according to an appropriate code. The data block is then delivered to the readwrite channel 16 which converts the digital data block into a write signal that is required by the transducer 14 for writing the data block to the disk 12. The controller 24, in conjunction with the servo unit 28, then causes the read/write channel 16 to deliver the write signal to the transducer 14 when the transducer 14 reaches the appropriate track and sector of the disk 12.

In another example, the host 30 may request that a data block stored in a particular track and data sector on the disk 12 be transferred to the host 30. In response, the controller 24 delivers a command to the servo unit 28 to move the transducer 14 to the appropriate position above the disk 12. Once the transducer 14 reaches the proper position, the controller 24 enables the read/write channel 16 to receive the analog read signal from the transducer 14, convert the analog signal to a digital data signal, and pass the digital signal to the ENDEC 17 for decoding. After decoding, the digital signal goes to the randomizer unit 18 which processes the digital signal in accordance with an initialization value from IVDU 26. As in the previous example, the IVDU 26 determines the initialization value using storage location information from the controller 24.

The ECC unit 20, under the control of controller 24, receives the digital data signal from the randomizer 18 and checks the signal to determine whether the signal includes any data error. If data error does not exist, the ECC unit 20 transfers the digital signal to the host 30 via interface 22. If data error does exist, the ECC unit 20 determines whether the error is correctable. In general, the error will be correctable if there are fewer than a predetermined number of bit errors in the data. If the error is correctable, the ECC unit 20 corrects the error and delivers the corrected signal to the host 30 via interface 22. If the error is not correctable, the ECC unit 20 discards the signal and informs the controller 24 of such.

The host 30 may include any type of data processing device having a central processing unit, such as a desktop or laptop computer. The interface 22 can include any type of device that is capable of regulating information flow between a host 30 and the disk drive system 10. The interface 22 may include, for example, a buffer memory (not shown) for equalizing data flow rates between the host 30 and the drive system 10. The ECC unit 20 may include any type of error encoding/decoding means that is capable of adding redundant information to the data and later using the redundant information to detect and possibly correct errors in the data.

The read/write channel 16 can include any type of channel capable of converting an analog read signal into a digital data signal representative of data stored on the disk 12 during a read operation and capable of converting data signals from the host 30 into appropriate write signals to drive a transducer 14 during a write operation. In this regard, the read/write channel 16 may include, for example, a peak detection channel, a decision feedback equalizer (DFE) channel, a finite delay tree search (FDTS) channel, and/or a partial response/maximum likelihood (PRML) channel.

The transducer 14 can include any type of device capable of reading and writing data and/or servo information from/to the disk 12. In addition, separate elements or separate units may be utilized by the transducer 14 for performing the read and write functions. The transducer 14 may include, for example, an inductive head, a thin film head, a magneto resistive (MR) head, and/or another type of head. The disk 12 is a data storage medium comprising, for example, a rigid or flexible substrate coated with a magnetic material. In addition, the disk 12 may include multiple axially aligned disks for increasing the storage capacity of the system 10 (in which case multiple transducers 14 would be required). During operation, the disk 12 is rotated about an axis by a spin motor (not shown) and the transducer 14 is held adjacent to the rotating magnetic surface to perform read and write operations.

The ENDEC 17 is operative for encoding data being transferred to the disk 12 from the host 30 with a run length limited (RLL) code (or other appropriate code) and for decoding data being transferred the other way. The RLL code ensures that the data being processed in the channel 16 and stored on the disk 12 does not include more than a maximum number or less than a minimum number of clocks between successive transitions in the data stream. The constraint used is generally dictated by the data detection means being implemented in the channel 16. It should be appreciated that the ENDEC 17 may be included as part of the read/write channel 16.

A data randomizer, in general, is a device that performs a predictable math operation on input data to produce an output data string that appears random. The math operation may then be repeated to recover the data. One randomization process commonly used is known as a pseudo-random process. In accordance with the present invention, the randomizer unit 18 includes an input 32 for a variable initialization value. The initialization value sets the starting point of the randomization process and basically determines how a data string from the host 30 will be converted to conform to the appropriate code constraints during a write operation. After data is read from the disk 12, it is again processed by the randomizer 18 to, in effect, derandomize the data. If the initialization value used by the randomizer 18 during the read operation is the same as the initialization value that was used when the data was written to the disk 12, then the data string output by the randomizer 18 during the read operation will be the same as the data string that was input to the randomizer 18 during the corresponding write operation (assuming no bit errors have occurred during writing, maintaining, and reading the data). If the initialization value used by the randomizer during the writing of the data is different than the initialization value used during the reading of the data, then the output of the randomizer 18 during the read operation will be different than the data originally written. In fact, the output data will have errors that are uncorrectable by the ECC unit 20. It should be appreciated that the present invention, although particularly apt for use in systems that otherwise require the use of a randomizer, can be implemented in practically any type of data storage system regardless of whether such systems ordinarily use randomizers.

As described above, the IVDU 26 determines the variable initialization value for the randomizer 18 using location related information corresponding to the data storage location that is presently being accessed by the host 30. The IVDU 26 calculates the same initialization value during a write operation to a particular storage location as it does during a read operation from the same location. In one embodiment of the present invention, the initialization value comprises the 4 least significant bits (LSBs) of the sector number of the data sector being accessed, the LSB of the cylinder number of the data sector being accessed, and 2 bits of the appropriate head number. These bits are assembled into a single initialization byte that always begins with a one. It should be appreciated that many different combinations of location related information can be used to generate the variable initialization value in accordance with the present invention.

By basing the variable initialization value upon the disk location being accessed and using the same initialization value during both read and write operations, data being read from the disk 12 is effectively checked to determine whether it is the data that the host 30 desired when the host 30 delivered the read request to the system 10. That is, the system 10 determines whether the data was read from the requested location and, if it was, whether the data is the data that is supposed to be in that location. If the data read from the disk was read from the wrong location, the initialization value used to derandomize the data will be different from the initialization value that was originally used to randomize the data, thus resulting in uncorrectable data errors. Likewise, if the data read from the disk was read from the correct location, but had previously been incorrectly written to that location, then the initialization value used to derandomize the data will also be different from the initialization value that was originally used to randomize the data and uncorrectable data errors will result.

When the ECC unit 20 receives the incorrect data from the randomizer 18, it detects that an uncorrectable error condition exists and informs the disk controller 24. The controller 24 can then inform the host 30 that the read operation has failed or it can retry the read operation without informing the host 30. Regardless of the action taken by the disk controller 24, the ECC unit 20 discards the data having the uncorrectable errors (i.e., the data is not transferred to the host 30). Therefore, the system 10 is capable of detecting and blocking incorrect read data before it gets to the host without an increase in disk overhead.

Figure 2:
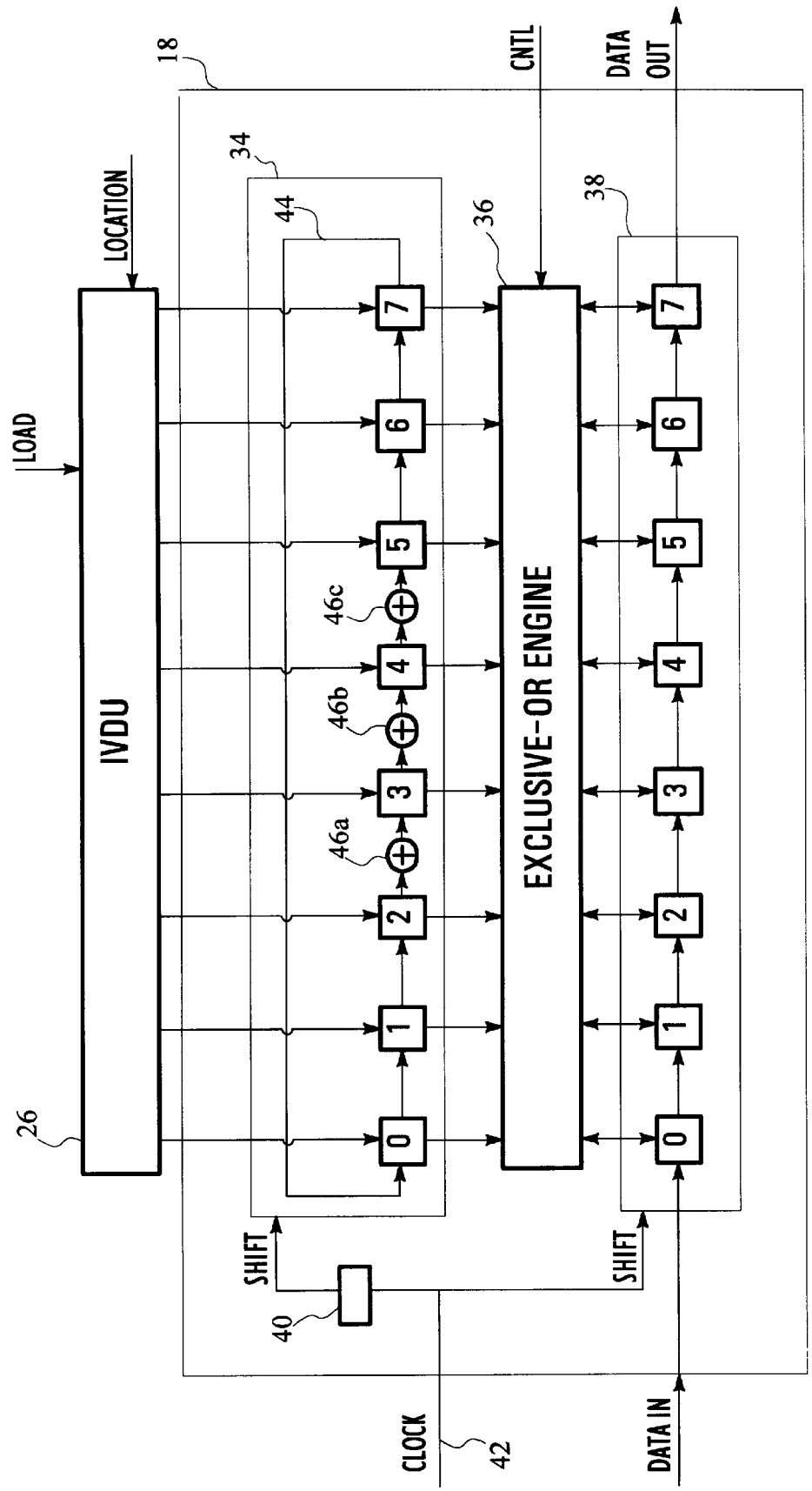
FIG. 2 is a block diagram illustrating a randomizer unit in accordance with one embodiment of the present invention.

FIG. 2 illustrates a randomizer unit 18 in accordance with one embodiment of the present invention. As illustrated, the randomizer unit 18 includes: a linear feedback shift register (LFSR) 34, an exclusive-OR engine 36, and a shift register 38. Also shown in FIG. 2 is the IVDU 26 coupled to the randomizer 18. When an access request is received by the controller 24, the controller 24 delivers location information to the IVDU 26 corresponding to the storage location on the disk 12 that is being accessed. The IVDU 26 uses this information to determine an initialization value for the LFSR 34. In the embodiment illustrated in FIG. 2, the initialization value (and the LFSR 34) is 1 byte (i.e., 8 bits) in length. After the initialization value is determined, the controller 24 delivers a load signal to the IVDU 26 that causes the IVDU 26 to transfer the initialization value to the LFSR 34, in parallel, to set a starting point for the randomization process. The LFSR 34 is initialized once for every access request received from the host 30.

After the LFSR 34 is initialized, data is shifted into the shift register 38 from an appropriate source. In the embodiment of FIG. 2, the shift register 38 is 1 byte in length (i.e., it is the same length as the LFSR 34). The data is shifted into the shift register 38 using a clock signal 42 from the controller 24 or some other source. After 8 clock cycles have elapsed, one byte of new data is in the shift register 38. The controller 24 then instructs the exclusive-OR engine 36 to bit wise exclusive-OR the new data in the shift register 38 with the data in the LFSR 34 (which at this point is still the initialization value). After the exclusive-OR operation is complete, the controller 24 instructs the exclusive-OR engine 36 to transfer the result of the exclusive-OR operation to the shift register 38, thereby replacing the data originally shifted in. The exclusive-OR operation and the transfer to the shift register 38 both occur in less than one clock cycle. The result data is then shifted out of the shift register 38 by the clock signal 42. At the same time, new data is shifted in and the process is repeated.

The LFSR 34 includes a feedback path 44 from the output of the register to the input. The feedback path 44 is also connected to multiple tap points 46a–46c along the length of the LFSR 34. When the LFSR 34 receives a shift pulse, the values stored in the various locations of the LFSR 34 change in a unique fashion that depends on both the feedback arrangement and the values currently in the LFSR 34. The clock circuit 40 receives the clock signal 42 and uses it to create a shift signal for the LFSR 34. The shift signal causes the LFSR 34 to shift once for every eight clock cycles of clock signal 42 and, therefore, once for every eight shifts of the shift register 38. Generally, the LFSR 34 is shifted on the next clock cycle after the result of the exclusive-OR operation is transferred to the shift register 38. It may be shifted, however, anytime before the next exclusive-OR operation is performed.

Using the above described circuitry, the randomizer 18 processes data byte-by-byte until all of the data associated with the current access request has been processed. If, for example, the access request requires the transfer of a 512 byte data block from the disk 12 to the host 30, the data block would be processed by the randomizer in 512×8=4096 clock cycles. After the current access request has been fulfilled, the controller 24 may begin to perform another access request. A new initialization value is determined by the IVDU 26 and transferred to the LFSR 34 and the process is repeated.

Although the present invention has been described in conjunction with its preferred embodiment, it is to be understood that modifications and variations may be resorted to without departing from the spirit and scope of the invention as those skilled in the art readily understand. For example, the invention can be used in data storage systems other than magnetic disk data storage systems, such as optical disk systems and tape based systems. Also, the ECC unit 20 of FIG. 1, can be replaced with virtually any type of error encoding/decoding unit, such as an error detection coding unit, a parity unit, or a cyclic redundancy check (CRC) unit. Such modifications and variations are considered to be within the purview and scope of the invention and the appended claims.

What is claimed is:

1. A data storage system, comprising:

a data storage medium; and a data randomizer that converts a first data segment into a second data segment based on an address of a selected data storage location on the data storage medium during a write operation to the selected data storage location.

2. The data storage system of claim 1, wherein the data randomizer converts the second data segment into the first data segment based on the address during a read operation from the selected data storage location.

3. The data storage system of claim 2, wherein the data randomizer converts the second data segment into a scrambled data segment different than the first data segment based on an address of a data storage location other than the selected storage location during a read operation.

4. The data storage system of claim 1, wherein the first and second data segments have identical bit lengths.

5. The data storage system of claim 1, wherein the data storage system is a disk drive.

6. A data storage system, comprising:

a data storage medium; and a data randomizer that randomizes data based on an address of a selected data storage location on the data storage medium during a write operation to the selected data storage location and that derandomizes the data based on the address during a read operation from the selected data storage location.

7. The data storage system of claim 6, wherein the data randomizer scrambles the data without derandomizing the data based on an address of any other data storage location than the selected data storage location during a read operation from the any other data storage location.

8. The data storage system of claim 6, wherein the data randomizer randomizes and derandomizes the data without changing a bit length of the data.

9. The data storage system of claim 6, wherein the data randomizer randomizes and derandomizes the data using a predictable mathematical operation that depends on an initialization value based on the address.

10. The data storage system of claim 9, wherein the predictable mathematical operation is not based on a content of the data.

11. The data storage system of claim 6, wherein the data randomizer randomizes and derandomizes the data byte-by-byte.

12. The data storage system of claim 6, wherein the data randomizer includes first and second shift registers and an exclusive-OR engine, the first shift register receives an initialization value based on the address, the second shift register receives the data during the read and write operations, and the exclusive-OR generator transfers an exclusive-OR of the first and second shift registers into the second shift register during the read and write operations.

13. The data storage system of claim 12, wherein the first shift register is a linear feedback shift register that includes a feedback path and multiple tap points connected to the feedback path.

14. The data storage system of claim 6, wherein the data storage medium is a rotatable disk.

15. The data storage system of claim 6, wherein the data storage medium is a set of axially aligned rotatable disks, and the address includes at least one bit representing a sector number, at least one bit representing a cylinder number, and at least one bit representing a head number.

16. A disk drive, comprising:
   a disk that stores data on concentric tracks;
   a transducer that transfers data to and from the disk;
   an interface that transfers data to and from a host computer; and
   a data randomizer between the interface and the transducer that converts unrandomized data into randomized data during a write operation to a selected data storage location on the disk, converts the randomized data into the unrandomized data during a read operation from the selected data storage location, and converts the randomized data into scrambled data other than the unrandomized data during a read operation from any data storage location other than the selected data storage location.

17. The disk drive of claim 16, wherein the randomized and unrandomized data have identical bit lengths.

18. The disk drive of claim 16, wherein the data randomizer converts the randomized data into the unrandomized data and converts the unrandomized data into the randomized data using a predictable mathematical operation that depends on an initialization value based on an address of the selected data storage location without depending on a content of the randomized and unrandomized data.

19. The disk drive of claim 16, wherein the data randomizer includes first and second shift registers and an exclusive-OR engine, the first shift register receives an initialization value based on an address of a data storage location on the disk, the second shift register receives the randomized data during the read operation and the unrandomized data during the write operation, and the exclusive-OR generator transfers an exclusive-OR of the first and second registers into the second register during the read and write operations.

20. The data storage system of claim 16, further including an error correction code unit between the data randomizer and the interface that reports an uncorrectable error in response to the data randomizer providing the scrambled data.

21. A disk drive, comprising:
   a disk with multiple data storage locations that each have a unique address;
   a data randomizer that randomizes a data block during a write operation using a mathematical operation as a function of a variable initialization value based on an address of a selected one of the data storage locations that is written to during the write operation, that derandomizes the data block during a read operation using the mathematical operation as a function of the variable initialization value based on the address of the selected one of the data storage locations that is read from during a read operation, and that scrambles the data block during a read operation using the mathematical operation as a function of the variable initialization value based on an address of any of the data storage locations other than the selected data storage location that is read from during a read operation; and
   an error correction code unit that encodes the data block during the write operation, decodes the data block during the read operation, and indicates an uncorrectable error in response to the scrambled data block.

22. The disk drive of claim 21, wherein the data randomizer randomizes, derandomizes and scrambles the data block without changing a bit length of the data block.

23. The disk drive of claim 21, wherein the mathematical operation is not based on a content of the data block.

24. The disk drive of claim 21, wherein the data randomizer includes a linear feedback shift register that stores the variable initialization value, a data shift register that stores the data block, and an exclusive-OR generator that provides the data shift register with an exclusive-OR of the linear feedback shift register and the data shift register.

25. The disk drive of claim 21, wherein the variable initialization value includes bits representing a sector number, a cylinder number, and a head number.

26. A disk drive, comprising:
   a disk that stores data on concentric tracks;
   a transducer that transfers the data to and from the disk;
   an interface that transfers the data to and from a host computer;
   a controller that selects a data storage location on the disk;
   an initialization value determination unit that receives an address of a data storage location selected by the controller during read and write operations and provides an initialization value based on the address;
   a data randomizer that processes the data during read and write operations, wherein the data randomizer randomizes the data during a write operation based on the initialization value, derandomizes the data during a read operation in which the initialization value matches that used during the write operation, and scrambles the data during a read operation in which the initialization value differs from that used during the write operation; and
   an error correction code unit that encodes the data during a write operation, decodes the data during a read operation and indicates an uncorrectable error during a read operation in which the data randomizer scrambles the data.

27. The disk drive of claim 26, wherein the data randomizer randomizes, derandomizes and scrambles the data without changing a bit length of the data and without depending on a content of the data.

28. The disk drive of claim 27, wherein the data randomizer includes a linear feedback shift register that stores the initialization value, a data shift register that stores the data, and an exclusive-OR generator that provides the data shift register with an exclusive-OR of the linear feedback shift register and the data shift register.

29. The disk drive of claim 28, wherein the linear feedback shift register includes a feedback path with multiple tap points connected to the feedback path, and the linear feedback shift register is directly connected to the initial value determination unit.

30. The disk drive of claim 29, wherein the linear feedback shift register, the data shift register and the exclusive-OR generator have identical bit lengths.

31. A disk drive, comprising:

a disk that stores data on concentric tracks;

a controller that selects an address for a data storage location on the disk to be read from during a read operation and to be written to during a write operation;

an initialization value determination unit that receives the address of the data storage location selected by the controller during the read and write operations and provides an initialization value based on the address, wherein the initialization value is identical during the read and write operations when the initialization value determination unit receives identical addresses during the read and write operations, and the initialization value is different during the read and write operations when the initialization value determination unit receives different addresses during the read and write operations; and a data randomizer that performs a mathematical operation on the data during the read and write operations, wherein the mathematical operation is a function of the initialization value.

32. The disk drive of claim 31, wherein the data randomizer randomizes the data during the write operation, derandomizes the data during the read operation if the initialization value used for the data during the read and write operations is identical, and scrambles the data during the read operation if the initialization value used for the data during the read and write operations is different.

33. The disk drive of claim 32, wherein the data randomizer scrambles the data during the read operation (i) if the data is written to a data storage location with an address other than the address selected by the controller during the write operation, and (ii) if the data is read from a data storage location with an address other than the address selected by the controller during the read operation.

34. The disk drive of claim 32, wherein the data randomizer includes a linear feedback shift register that stores the initialization value, a data shift register that stores the data, and an exclusive-OR generator that provides the data shift register with an exclusive-OR of the linear feedback shift register and the data shift register during the read and write operations.

35. The disk drive of claim 32, further including an error correction code unit that encodes the data during the write operation, decodes the data during the read operation, and indicates an uncorrectable error during the read operation if the data randomizer scrambles the data.

* * * * *